Dec. 27, 1966  M. ALTERMATT  3,294,887
PROCESS FOR MANUFACTURING ELONGATED MEMBERS OF
PLASTIC, PARTICULARLY OF SYNTHETIC
RESIN, WHICH HAVE EYELIKE PORTIONS
AND ARE REINFORCED BY INSERTS
CONSISTING PREFERABLY OF
FIBER MATERIALS

Filed Nov. 9, 1961

Inventor:

Max Altermatt

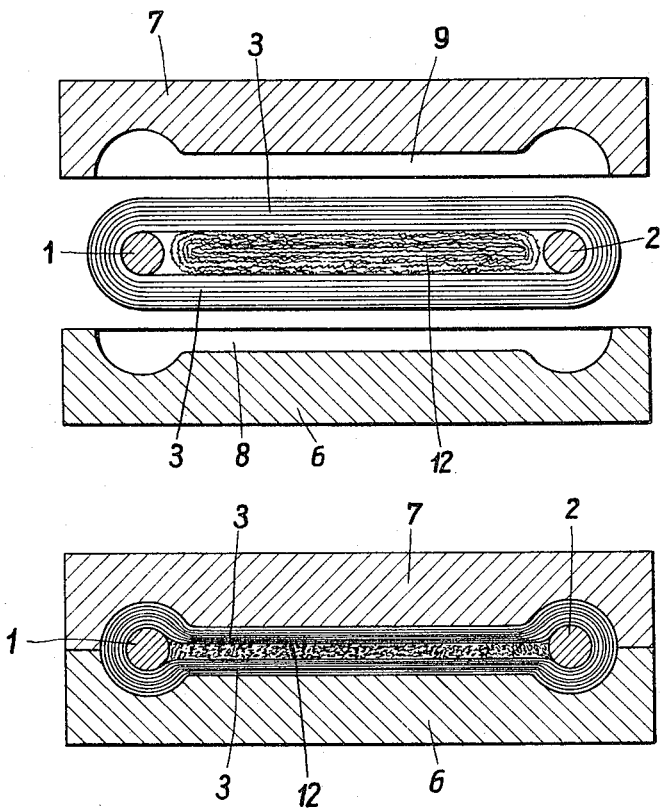

United States Patent Office 3,294,887
Patented Dec. 27, 1966

3,294,887
PROCESS FOR MANUFACTURING ELONGATED MEMBERS OF PLASTIC, PARTICULARLY OF SYNTHETIC RESIN, WHICH HAVE EYELIKE PORTIONS AND ARE REINFORCED BY INSERTS CONSISTING PREFERABLY OF FIBER MATERIALS
Max Altermatt, Zullwill 54A, Solothurn, Switzerland
Filed Nov. 9, 1961, Ser. No. 151,389
Claims priority, application Austria, Nov. 15, 1960, A 8,489/60; Aug. 25, 1961, A 6,543/61
4 Claims. (Cl. 264—229)

The present invention relates to processes for manufacturing elongated members of plastic, particularly of synthetic resin, which have eyelike portions and are reinforced by inserts consisting preferably of fiber materials.

The previous practice was to place the inserts into the cavities of the molds used for manufacturing the plastic members, whereafter the cavities of the mold were filled with plastic. The synthetic resin introduced was then cured, the molds were opened and the plastic member was removed from the mold. Under the action of the plastic introduced and of gravity, however, the inserts were displaced from their position prescribed in the drawing and consequently were not arranged as required to impart a particularly high strength to the plastic members.

It is an object of the present invention to eliminate these disadvantages.

The process which is proposed to solve this problem and serves for manufacturing elongated members of plastic, particularly of synthetic resin, which have eyelike portions and are reinforced by inserts consisting preferably of fiber materials, is characterized according to the invention in that the reinforcing inserts are wound in the form of suitably continuous fiber bundles on cores arranged in areas where the plastic members are to be formed with eyes, and are then placed into a mold and impregnated with the plastic, whereafter the mold is closed and the plastic, particularly the synthetic resin, is cured. The cores hold the reinforcing inserts exactly in the desired position, particularly when the spacing of the cores slightly exceeds the length of the intervening fiber bundle material so that the fiber bundle is stretched or even tensioned to some extent. Whereas this enables the elimination of the action of gravity and of the jet pressure of the plastic which is introduced, further advantages are obtained thereby that the reinforcing inserts can be arranged in profiled compression molds in a position in which at least individual layers of the reinforcing inserts follow the course of stress trajectories which occur when the plastic member is stressed in use.

The process can be considerably accelerated when a plurality of fiber bundles forming reinforcing inserts belonging to different plastic members are applied in succession to the cores in the longitudinal direction of the latter and are jointly impregnated with plastic so that an integral block of plastic, particularly of synthetic resin, is formed, which block is divided into individual members, e.g., by sawing, after it has been cured.

The reinforcing inserts may consist of a wide range of materials, particularly of glass fiber bundles known as rovings. The synthetic resins may consist of thermoplastic or thermosetting resins. The process is particularly suitable for the manufacture of connecting-rods as are used, e.g., in switches for the transmission of one switch member to another. Since these switch rods consist of plastic, they ensure the required insulation between the members to be operated.

The arrangement of the cores may be such that triangular spaces are left close to the eyes between the sides of the fiber bundles which lie between the cores in the closed mold, which triangular spaces correspond approximately to the turbulent region which would be formed if the cores were fixed parts in a flowing fluid around them. Since the said connecting-rods are subjected to relatively high stresses, the non-reinforced plastic lying in these triangular spaces could exert a wedgelike bursting action when under said special stress conditions the stressing member disposed in the eye of the finished plastic member acts only on said triangular plastic portions which do not contain reinforcing fibers. In order to avoid this situation, a development of the invention resides in that an insert consisting preferably of a mat of reinforcing fibers in the form of a roll is inserted into the space confined by the fiber bundle-holding cores and the sides of the reinforcing fiber bundles so that said insert fills said space before the mold is closed. When the mold is closed, the approach of the sides of the reinforcing fiber bundles to each other will cause an elongation of this mat so that the latter contacts the cores under a certain initial stress. This initial stress can be initially provided when a mat is used which is somewhat wider than the spacing of the cores. With a mat of suitable thickness and width, this initial stress is so high that the mat cannot be displaced even when the mold is closed under pressure. The mat will absorb the synthetic resin or is impregnated with the same so that the finished plastic member has also in its portions directly adjoining the cores approximately the same structure as adjacent to the reinforcing fiber bundles themselves. As a result, the fitting of the stressing machine members into the eyes of the finished plastic member will cause the forces to be taken up only by fiber-reinforced plastic portions, even if these stressing members stress only those surfaces of the plastic member which adjoin the above-mentioned triangular portions, so that the forces will be transmitted without the phenomena described hereinbefore.

An insert consisting of a glass fiber mat in the form of a flat roll similar to a roll of cloth is preferably introduced into said space. The insert is preferably impregnated with preferably self-curing synthetic resins also described as thermosets.

Apparatus for carrying out the described processes are preferably characterized by an arrangement of cores, to which fiber bundles forming reinforcing inserts are applicable by slipping the fiber bundles on the cores in the longitudinal direction of the latter, and which comprises a holder, which holds the fiber bundles in their relative position at least during the impregnation thereof with plastics, and molds associated with said arrangement of cores for receiving the fiber bundles and profiled to impart in conjunction with the cores to the fiber bundles a position wherein the fiber bundles follow the course of stress trajectories which occur when the finished plastic member is stressed in use.

The plastic members manufactured by the processes are characterized in that their reinforcing inserts follow the course of stress trajectories which occur when the finished plastic member is stressed in use. When the process is modified in that an insert is inserted into the space confined by the fiber bundle-holding cores and the sides of the reinforcing fiber bundle so that said insert fills said space before the mold is closed, the fiber-reinforced plastic members manufactured by this process and having openings around which the fiber reinforcements extend possess the additional feature that confronting boundary surfaces of the openings in the plastic member are disposed in the direct vicinity of accumulations of reinforcing fibers disposed in the space between the sides of the continuous reinforcing fiber bundle.

The drawing shows illustrative embodiments of the invention for the manufacture of plastic members which are similar to connecting-rods and which are to be reinforced by glass fibers which follow exactly the course of the stress trajectories which occur during the operation of such a linkage member similar to a connecting-rod. The drawings are diagrammatic representations of the process steps carried out according to the invention in the manufacture of the plastic members.

Specifically,

Figure 3:
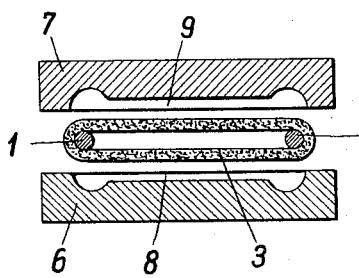
FIG. 3 shows that phase of the process in which the fiber bundle has already been impregnated with synthetic resin and inserted into the mold, which is about to be closed.

FIG. 6 shows a process step which is carried out after the parts have reached the position shown in FIG. 3 when the process is to be carried in its modified form, in which an insert is inserted into the space confined by the fiber bundle-holding cores and the sides of the reinforcing fiber bundle so that said insert fills said space before the mold is closed. FIG. 6 shows the position of the parts before the mold is closed.

FIG. 7 shows the same parts after the mold has been closed. The impregnating step performed preferably between the phases of FIGS. 6 and 7 has not been shown because it is known per se.

Figure 1:
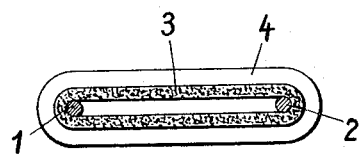
FIG. 1 is a vertical transverse sectional view showing a fiber bundle which forms a reinforcing insert and is wound on two cores.
Figure 2:
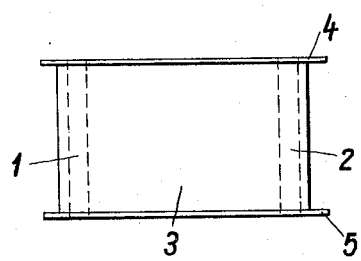
FIG. 2 is a top plan view of the arrangement of FIG. 3.
Figure 4:
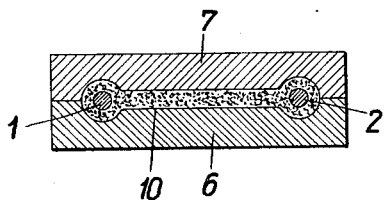
FIG. 4 is a transverse sectional view showing the closed mold.

In FIG. 1, reinforcing inserts in the form of a fiber bundle 3 are wound around two cores 1, 2. In accordance with the nature of the invention, it is not essential that continuous glass fibers or bundles of glass fibers are wound on the cores. In special cases, closed fiber bundles may be formed and in this closed condition may be slipped on the cores 1, 2. To maintain the relative position of the cores 1, 2, the latter are received at both ends in openings formed in straps 4, 5. The cores 1, 2 held in the straps 4, 5 remain suitably in position when the fiber bundle 3 is impregnated with synthetic resin. The body consisting of the parts 1, 2, 3 is then placed into the mold, which is suitably bipartite and comprises the base 6 and the top 7. FIG. 3 shows that the base and top 6, 7 are so profiled at 8, 9 that in the closed mold 6, 7, as shown in FIG. 4, the fiber bundle 3 conforms to the shape of the molding 10. In this molding, the glass fibers of the fiber bundle 3 are arranged to follow the course of the stress trajectories which occur when such a workpiece having the shape 10 is subjected to the stresses usually encountered by it in use. The straps 4, 5 need not be removed from the cores 1, 2 before the impregnating step. If it is desired to impart a certain initial stress to the fiber bundle 3 during the impregnating step or in the mold 6, 7, the straps 4, 5 may remain on the cores 1, 2. In this case, they will engage the boundary surfaces of the mold when the same is closed.

Figure 5:
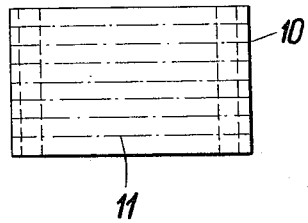
FIG. 5 is a top plan view showing the product block, which will be divided into the individual workpieces to be made by the process. This division will be described in detail hereinafter.

FIG. 5 shows the product block 10. It is apparent that in carrying out the process, a plurality of reinforcing inserts consisting of fiber bundles 3 associated with different plastic members have been successively applied to the cores 1, 2 in the longitudinal direction thereof and have been jointly impregnated with synthetic resin to form the plastic block 10. Hence, the division of the plastic block 10 along the parting lines 11 will result in a plurality of finished workpieces, which distinguish by a particularly high strength. More particularly, it has been found that connecting-rods manufactured according to the proposed process have a strength which is three times that obtained according to the previously usual processes.

FIGS. 6 and 7 show the previously described parts in the case in which an insert consisting preferably of a mat of reinforcing fibers in the form of a roll has been inserted into the space confined by the fiber bundle-holding cores and the sides of the reinforcing fiber bundle to fill said space before the mold has been closed.

In FIG. 6, 7 is again the top and 6 the base of the mold. The parts 7, 6 are profiled at 9 and 8 as is required in view of the shape of the plastic member to be manufactured. The cores 1 and 2 are disposed in the areas where eyes are desired in the molding to be manufactured. 3 is a continuous glass fiber bundle or roving, which is held by the cores 1, 2, which may be held so that an initial stress of desired magnitude is applied to the fiber bundle 3. It is apparent in FIG. 3 that without the measures illustrated in FIGS. 6 and 7 the sides of the fiber bundle 3 will define between themselves a cavity, which is filled in the embodiment shown in FIGS. 6 and 7 by an insert 12 consisting of a glass fiber mat in the form of a roll similar to a flat cloth roll. The thickness of this insert 12 and its width measured in the direction of the spacing between the cores 1, 2 are so determined that the space between the sides of the glass fiber bundle 3 shown in FIG. 3 is filled and that the shorter boundary surface of the roll formed by the glass fiber mat 12 contact the cores 1, 2. This contact may involve a certain initial stress, e.g., if the mat roll 12 is inserted into the space visible in FIG. 3 before the cores 1, 2 have reached their final position. In this case, the thickness of the roll 12 slightly exceeds the distance between the two sides of the bundle 3. When the cores are moved to their final position, e.g., under the action of a device, not shown, which urges them apart, the sides of the bundle 3 will stretch and will compress the somewhat thicker roll so that it is elongated and its end faces contact the cores 1, 2 under the desired initial stress.

After the parts have reached the position shown in FIG. 6, an impregnation, not shown, with synthetic resin or another substance is carried out unless the synthetic resin is introduced into the closed mold.

The mold is then closed so that the position shown in FIG. 7 is obtained. The molding conforms to the profile 8, 9 in the manner shown. As a result, the free space shown in FIG. 3 to exist between the sides of the fiber bundle 3 disappears completely. The roll 12, the thickness of which has been greatly reduced, conforms entirely to the now confronting boundary faces of the cores 1, 2 so that any initial stress which had been provided is increased. As a result, a resistant abutment, through which glass fibers extend and to which a resistance to buckling has been imparted by the sides of the fiber bundle and the synthetic resin, lies between the sides of the reinforcing fiber bundle 3 and the cores 1, 2 and is capable of taking up the same mechanical stresses as that portion of the molding in which the glass fiber bundle 3 is disposed. Even when machine members disposed in openings which correspond to the cores 1, 2 apply forces which act only on this abutment, these forces will be taken up without difficulty.

What is claimed is:

1. A process of manufacturing plastic members having reinforcing inserts and eyelets, said process comprising the steps of applying the reinforcing insert in the form of an endless loop onto two spaced apart cores; increasing the distance between said cores to pretension said endless loop; placing said endless loop only after it has been pretensioned in pretensioned condition in the cavity of a composite mold; introducing plastic material into said mold cavity; closing the mold and engaging, during closing of the mold, portions of said endless loop between said cores to press said portions toward each other and thereby further tension said loop; and curing the plastic material.

2. A process of manufacturing plastic members having reinforcing inserts and eyelets, said process comprising the steps of applying the reinforcing insert in the form of an endless loop onto two spaced apart cores; increasing the distance between said cores in a given direction to pretension said endless loop; filling the space in the interior of said loop between said cores with a filling insert while maintaining said endless loop in pretensioned condition; placing said endless loop only after it has been pretensioned in pretensioned condition with the filling insert in said loop in the cavity of a composite mold; introducing plastic material into said mold cavity; closing the mold and engaging, during closing of the mold, portions of said endless loop between said cores to press said portions toward each other transversely of said given direction and thereby further tensioning said loop while compressing said filling insert filling the interior of said loop transversely of said given direction and elongating it in said given direction whereby said filling insert is caused to completely fill said space; and curing the plastic material.

3. A process as set forth in claim 2, wherein said filling insert consists of a fiber mat in the form of a roll.

4. A process as set forth in claim 2, wherein said filling insert consists of a glass fiber mat in the form of a flat roll similar to a roll of cloth.

References Cited by the Examiner

UNITED STATES PATENTS

| | | |
|---|---|---|
| 1,863,799 | 6/1932 | Loetscher. |
| 2,256,701 | 9/1941 | Bacon _____ 264—258 |
| 2,292,118 | 8/1942 | Guhl. |
| 2,350,421 | 6/1944 | Schoder et al. |
| 2,372,929 | 4/1945 | Blessing. |
| 2,444,394 | 6/1948 | Arnold _____ 264—257 |
| 2,859,936 | 11/1958 | Warnken. |
| 2,993,822 | 7/1961 | Reeves _____ 264—257 |
| 3,028,284 | 4/1962 | Reeves _____ 264—257 |
| 3,057,767 | 10/1962 | Kaplan _____ 264—275 X |
| 3,089,522 | 5/1963 | Phelps _____ 264—258 |
| 3,101,994 | 8/1963 | Hartman _____ 264—257 |
| 3,111,569 | 11/1963 | Rubenstein _____ 264—265 |

ROBERT F. WHITE, *Primary Examiner.*

MICHAEL V. BRINDISI, ALEXANDER H. BRODMERKEL, *Examiners.*

F. MARLOWE, L. S. SQUIRES, *Assistant Examiners.*